Dec. 23, 1941.  R. H. CHERRY  2,267,551
ELECTRICAL MEASURING SYSTEM
Filed Oct. 13, 1939
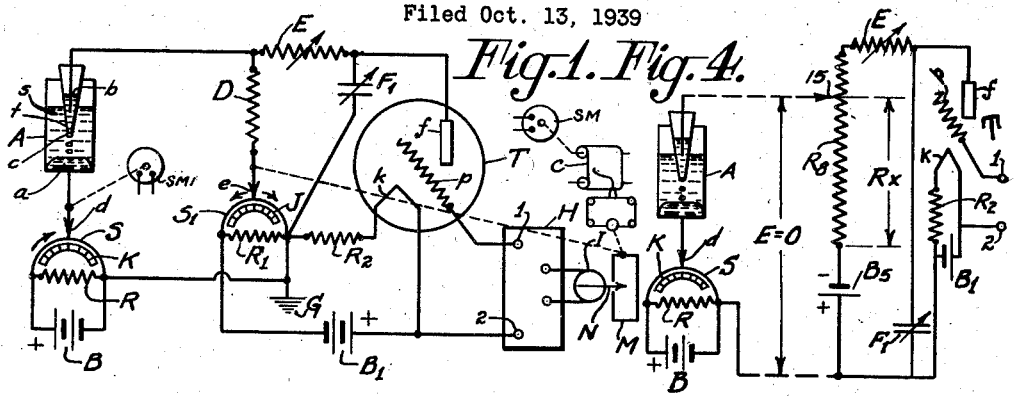
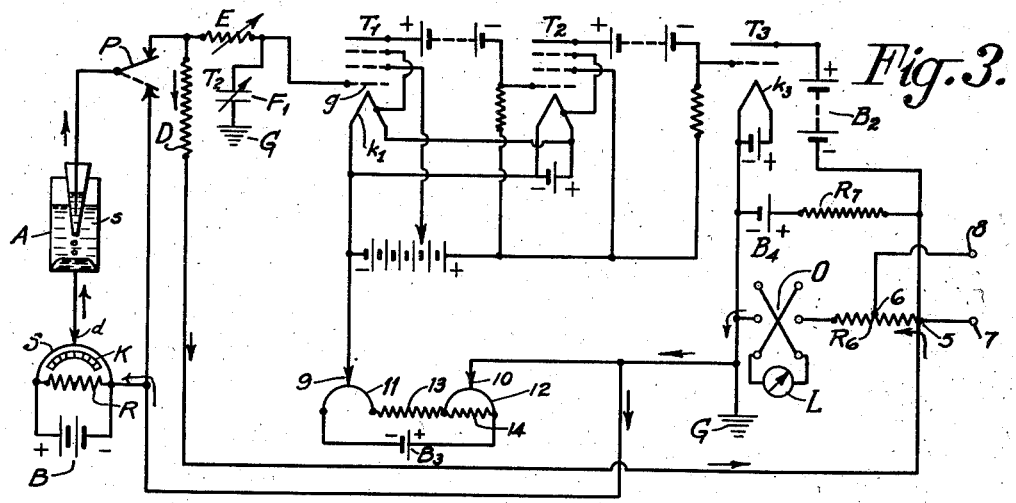
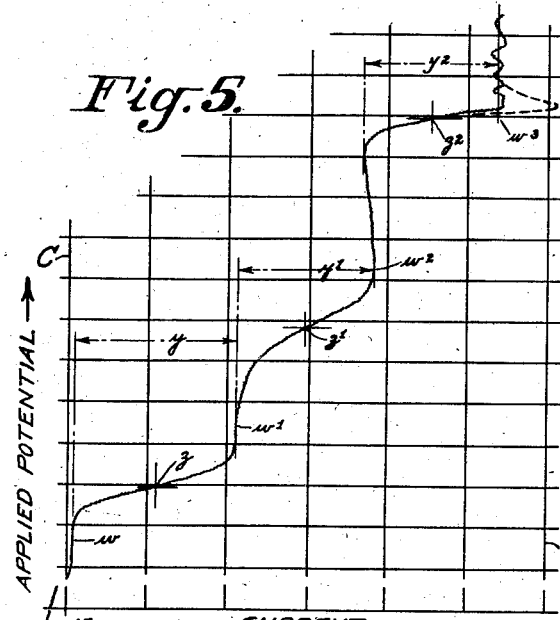
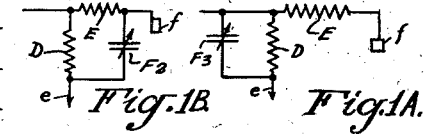
Fig. 1. Fig. 4. Fig. 3. Fig. 1B. Fig. 1A. Fig. 2. Fig. 5.
INVENTOR.
Robert H. Cherry
BY
Cornelius D. Ehret
ATTORNEY.

Patented Dec. 23, 1941

2,267,551

UNITED STATES PATENT OFFICE 2,267,551

ELECTRICAL MEASURING SYSTEM

Robert H. Cherry, Glenside, Pa., assignor to Leeds & Northrup Company, Philadelphia, Pa., a corporation of Pennsylvania Application October 13, 1939, Serial No. 299,279

18 Claims. (Cl. 175—183)

My invention relates to methods of and apparatus for determination of characteristics of electrolytic or other solutions or for qualitative and/or quantitative electrochemical or electrolytic analyses of liquids or solutions, organic or inorganic, in which the substances, which affect the counter-electromotive force of the polarized dropping or non-dropping electrode cell, may be those which either do or do not ionize in the solution or liquid, and more particularly to methods and apparatus for graphically plotting or recording the involved magnitudes of current and potential and their relations underlying such aforesaid determinations or analyses.

In accordance with my invention, aforesaid determinations or analyses, by determination of changes in the total current passing through the cell having a polarized electrode and the applied or effective voltage, are effected without recourse to or need for the heretofore commonly used highly sensitive galvanometer, in immediate circuit with the cell for measurement of the current therethrough, which because of its essential sensitivity requires elaborate supports to avoid errors due to vibration, and whose deflections were photographically recorded, involving the need for development of the records before observable; besides, the fall of potential across the resistance of the galvanometer, due to the current therethrough, constituted an error respecting the voltage or potential difference applied to or across the cell, overcome by my invention by recourse to null methods; and the applied voltage has commonly been shown by flashing a beam of light across the photographic chart at definite voltage intervals.

Aforesaid disadvantages and complications are, in accordance with my invention, avoided, and the cell and means for varying the voltage applied thereto are so related to a balanceable network and a robust galvanometer of relatively short period, or equivalent, with intervention of amplification, that the variations of current through the cell are recorded, by apparatus of any suitable type, including industrial recorders, by pen or equivalent upon a chart whose extents of movement represent voltages, more particularly applied voltages whose magnitudes progressively increase or decrease with time during which the record sheet or chart is moved; the coordinates of the record are respectively magnitudes of current and potential or time.

More particularly the voltage applied across the cell is varied as a function of time; and the current through the cell is employed to set up a fall of potential which is balanced by an opposing potential difference whose magnitude is for that purpose varied, preferably automatically, by or under the control of the recorder of aforesaid current-potential relations or by a self-balancing, preferably by a negative feed-back, amplifier.

Further in accordance with my invention, there is provided a network, preferably comprising resistance and reactance, preferably capacity, of such magnitudes as to effect such high time constant, sufficiently longer than the inverse frequency of detachment of drops from the dropping electrode, of the current-measuring system that its response is in the nature of a ballistic integration, so to eliminate or sufficiently reduce those disturbances to the record which otherwise would result from the intermittent dropping from aforesaid electrode; or, in general, whether the polarized electrode be of the dropping type or not, the time constant may be made greater than the time interval between successive operative steps of the recorder.

My invention resides in the further broader, more specific and distinct aspects of method and apparatus hereinafter described and claimed.

For an understanding of my methods, and of some of the forms my apparatus may take, reference is had to the accompanying drawing, in which:

Fig. 1 is a diagram of one form of circuit arrangement and apparatus comprehended by my invention;

Figs. 1A and 1B illustrate alternative connections of elements shown in Fig. 1.

Fig. 2 is a diagram of a portion of the system of Fig. 1;

Figs. 3 and 4 are, respectively, diagrams of further forms comprehended by my invention;

Fig. 5 is an example of a graph or record, illustrative of both qualitative and quantitative determinations made in accordance with my method and by my apparatus.

Referring to Fig. 1, A generally represents a cell comprising a container of glass or other suitable material for the electrolytic or other test solution or liquid $s$ with which contact is made by, or in which are immersed, the two electrodes of the cell of which $a$, generically representing a reference electrode, has such area of contact with the solution $s$ that with the current magnitudes involved it does not substantially polarize, and the other, $c$, herein termed the polarized electrode, may be either a dropping electrode, as illustrated, or an ordinary stationary or non-dropping electrode, in both cases having relatively far smaller area of contact with solution s to cause it to be polarized as and for the purposes, behavior and effects herein described and understood in this art.

When the electrode c is of the dropping type, it may consist of mercury or other suitable liquid conductor, not miscible with solution s, passing from the store b thereof through a capillary tube t and periodically dropping therefrom, the drops in the example illustrated, collecting on or constituting the electrode a, each drop before detachment from the capillary tube t constituting the polarized electrode, whose counter-electromotive force, whether it be of the dropping or aforesaid stationary type, is affected by the substances in the liquid or solution s. When the electrode c is of the dropping type the number of drops per unit of time may be anything suitable or desirable, in dependence upon the diameter and length of the capillary tube t, the pressure exerted by the liquid b, and other factors well understood in the art. For example, the number of drops per minute may be from ten to fifteen; or any other number suitable for the particular determinations or analysis to be made.

The battery or equivalent source B of unidirectional current, whose polarity may be reversed from that shown when for well-known circumstances electrode c is required to act as its anode, passes current through the resistor R and the slide-wire resistance S in parallel therewith. Bearing on the slidewire S is a contact d, connected to the cell electrode a. Connected to the polarized electrode c is one terminal of the high resistance D whose lower terminal connects to the contact e sliding along the slidewire S1 shunted by the resistor R1 in circuit with the battery or source B1 of unidirectional current, the cathode k of the electronic or thermionic tube T, and with biasing resistance R2 of fixed or variable magnitude sufficient, when required, to impress upon the input electrodes of the tube T a voltage or potential difference of magnitude for determining the optimum or any other desired tube characteristic. One terminal of slidewire S1 and its shunting resistance R1 is connected, if desired, to ground G, utilized particularly when shielding of the tube or amplifier system is desired, and to one terminal of the battery B, resistance R and slidewire S.

By means of slidewire S1 and its contact e, a variable voltage is opposed to the voltage or fall of potential across an impedance the resistance D, due to the current passing through the cell A. The position of contact d upon slidewire S determines the voltage impressed upon and the current passed through the cell A, such current, however, being dependent upon the counter-electromotive force of the polarized electrode c, as will appear in connection with Fig. 5.

The terminal of resistor D remote from the contact e is connected to the control electrode f of the tube T which may be of any suitable type, as of the type exemplified by Westinghouse tube RH 507.

There is accordingly impressed upon the input electrodes f, k of tube T an electromotive force which is the algebraic sum of the fall of potential across the resistance D due to the current through the cell A, and the fall of potential between the contact e and right-hand terminal of slidewire S1 and resistor R1.

When aforesaid algebraic sum of electromotive forces is finite, the current in the output or plate circuit of the amplifier tube T, or in the last stage of a multistage amplifier, represented generically by T or of which the tube T is the first stage, partakes of a magnitude representative of the algebraic sum of the electromotive forces impressed upon the input circuit of the tube T, whose electrodes k and p are in its output circuit.

When the algebraic sum of the electromotive forces impressed upon the input of the amplifier is zero, then the plate circuit current affecting the galvanometer I, associated with the output circuit of the amplifier, may still be finite; however, the effect upon the galvanometer I for zero electromotive force impressed on electrodes f, k, may be made zero as by an arrangement, or general equivalent thereof, hereinafter referred to in connection with Fig. 2.

In the output system of the tube T or of the last stage of a multistage amplifier of which it is a part, is a galvanometer I which preferably is robust, as compared with the highly sensitive galvanometer heretofore usually employed directly or immediately in circuit with the cell A and its source of current. Galvanometer I preferably is of relatively short period, and need not to any substantial or particular degree be ballistic. Its deflecting needle or pointer N may be or is utilized to control a recorder M, such as an industrial recorder, whether continuously acting or whether acting periodically or intermittently.

A suitable recorder operating or so acting intermittently or by steps is generically exemplified by the recorder of Leeds Patent #1,125,699 in which latter the galvanometer and its pointer 42 would consist of my galvanometer I and its pointer N.

When my recorder is of the type generically represented by aforesaid Leeds patent, the slidewire S1 may be mounted upon the shaft 31 of the Leeds patent, whereby the slidewire S1 is rotated with respect to the stationary contact e; whereby, in response to a finite electromotive force impressed upon the input electrodes f, k of tube T, the mechanism of recorder M, under the control of the galvanometer needle N, moves the slidewire S1 with respect to contact e to such extent and in such direction as to oppose to the fall of potential across resistance D a voltage equal thereto, so to reduce to zero the electromotive force impressed upon the input electrodes of the tube, and simultaneously the marker or pen of the recorder mechanism is moved transversely of the record sheet or chart C, Fig 5, continuously fed lengthwise, as in aforesaid Leeds patent, by a motor SM, which for present purposes may be of the synchronous alternating current type When the algebraic sum of aforesaid voltages, impressed on the amplifier, becomes zero, the slidewire S1 comes to rest.

During a test or run, the slidewire S and its contact d are rotated relatively to each other progressively to increase the voltage applied to the cell A. Assuming the contact d is stationary and that slidewire S is rotated with respect thereto, its rotation will be in the direction of the arrow indicated, the contact d in effect traversing the slidewire S from its right to its left end within a time preferably corresponding with or exceeding the length of the run. The speed of relative movement of contact d with respect to slidewire S, while not necessarily uniform, is made equal to or definitely proportional to the speed of movement lengthwise, in a vertical direction, Fig. 5, of record sheet or chart C. This speed of adjustment of the electromotive force impressed upon the cell A is made equal to or definitely related to the speed of movement of the recorder chart C by driving the slidewire S with respect to the contact $d$ by a synchronous motor SM1 energized by alternating current of the same instantaneous frequency as that of the current which energizes aforesaid synchronous motor SM which advances or drives chart C. In consequence, the voltage impressed upon the cell A varies as a function of time, and in consequence ordinates of the record on chart C are in terms of voltage or potential applied to the cell, while its abscissae represent magnitudes of the current passing through cell A, aforesaid resistance D and slidewire S1.

In Fig. 1 the rectangle H represents an assembly of the Wheatstone bridge of Fig. 2 and, if desired, the amplifier tube or tubes and appurtenances of the amplifier system.

The terminals 1 and 2, at the rectangle H, Fig. 1, correspond, respectively, with the terminals 1 and 2 of the diagram of Fig. 2 which illustrates a Wheatstone bridge in one arm of which are connected the output electrodes $p$ and $k$ of the amplifier T, or last tube of a multistage amplifier, and in the other three arms of which are impedances or resistances, R3, R4 and R5. In one conjugate conductor 3 of the bridge is included the amplifier's plate or output circuit battery B2, and in the other conjugate conductor 4 is included aforesaid galvanometer I. Between the upper arms $p$, $k$—R3 and lower arms R4—R5 are included, respectively, the slidewire resistances S2 and S3 upon which are manually adjustable contacts constituting the terminals of the conjugate conductor 4. Manual adjustments of these upper and lower contacts on slidewires S2 and S3 effect, respectively, coarse and fine adjustments of the impedances or resistances on opposite sides of the slide or contacts, to procure zero or desired finite deflection of galvanometer I for the conditions of zero or predetermined finite current through the cell A.

Between the upper terminal of the resistor D, Figs. 1 and 2, and the control electrode $f$ of tube T, is interposed a resistance E between whose right-hand terminal and the right-hand terminal of the slidewire S1 is connected a capacity F1. The resistance and capacity function as a means for introducing a time constant effecting a response of the current-measuring system, as viewed either from the amplifier or the recorder M, in the nature of a ballistic integration, so to eliminate or sufficiently to reduce those disturbances, due to intermittent dropping, to that degree of smoothness of the record upon the chart C essential to its interpretation respecting, especially, other current phenomena of non-periodic nature and of primary interest. For this purpose, the resistance E and capacity F1 are made such as to afford a time constant, for securing aforesaid ballistic integration effect, greater than the period of dropping from electrode $c$, which is accompanied by intermittent current impulses in the system individually varying with the growth of the successive drops before detachment from tube $t$. Either the resistance E or capacity F1, or both, preferably is or are adjustable, so at will to vary the time constant.

When, however, the polarized electrode $c$ is not of the dropping type, but of the ordinary or above-mentioned stationary type, resistance E and capacity F1 may be dispensed with. However, when the electrode $c$ is of the stationary type, and the recorder controlled by needle N of galvanometer I is of the step-by-step or intermittently operating type, resistances E and F1 may be employed to afford a time constant preferably materially greater than the time between successive marker movements of the recorder mechanism, exemplified by the time between successive actuations of the member 27 of aforesaid Leeds patent by cams 58.

When resistance E and a capacity F so effect a time constant greater than the period between successive recording actions of the recorder, that time constant is sufficient to avoid undue disturbances by shorter dropping periods in cell A.

For example, when the period of dropping from a dropping electrode is fifteen drops per minute, a time constant effected by resistance E and capacity F may be five seconds; when the period between successive recording actions of the recorder M is, for example, two seconds, the magnitudes of resistance E and capacity F1 provide a time constant which may be of the order of five seconds, in which case the time constant is also adequate for the periodicity of dropping.

Aforesaid time constant for either or both of the purposes aforesaid may be obtained also by connecting the condenser F1 between the right-hand terminals of resistance E and the lower terminal of resistance D, as indicated at F2; or across the terminals of the resistance D may be connected a capacity F3 which, with the resistance D, effects the desired time constant.

Referring to Fig. 5, there is shown a record for interpretation, as for qualitative and quantitative analysis respecting electrochemical characteristics of the solution or liquid or contents thereof in cell A; more particularly, when the polarized electrode $c$ is of the dropping type. The slidewire S is moved, as aforesaid, at constant rate with respect to its contact $d$, subjecting the cell to a voltage beginning, say, at magnitude $v$ and rising steeply to a point $w$ where the characteristic curve or graph is parallel to the vertical axis of ordinates, designating practically no significant change in magnitude of current passing through the cell.

As the applied voltage increases with progression of time, the characteristic curve attains a point or region $w1$ where again it is substantially parallel to the vertical axis of coordinates. The magnitude of change of current $y$ is an indication of the quantity or degree of concentration of a particular ion or substance in the liquid or solution in cell A, and the point or region of inflection $z$ indicates a particular voltage which, from prior knowledge, it is understood that in the solution or liquid is a particular ion or substance whose concentration or amount per unit volume of the solution is indicated by $y$. By increase of voltage impressed upon the cell, the characteristic again departs transversely to a further region or point $w2$ in reaching which the characteristic has exhibited a second inflection point or region $z1$ indicating the presence of a further particular ion or substance present in concentration represented by $y1$; and further increasing the voltage causes a further increase in current to a region indicated approximately at $w3$ in advance of which the characteristic has passed through a further inflection point or region $z2$ indicative of a particular ion or substance of or in solution or liquid $s$, with a concentration represented by the change in current $y2$.

In the example illustrated, the inflection point $z$ and the current increase $y$ are indicative, respectively, of the presence of cadmium ions with a concentration $y$, the liquid $s$ being a .1 normal solution of lithium chloride, the reference electrode being mercury or calomel, in effect the latter because of the chloride ions provided by the lithium chloride. The inflection point $z1$ indicates from its voltage the presence of nickel in the solution with ion concentration $y1$; and the inflection point $z2$ indicates the presence of manganese with ion concentration represented by the current change $y2$. The vertical ordinates represent voltages impressed upon the cell as a function of time; and the departures of the characteristic curve transversely represent magnitudes of current through the cell and resistance D.

Accordingly there is effected in accordance with my invention an immediately observable and interpretable record upon a chart or sheet of the current-potential relations from aforesaid aspects of which there is obtained both a qualitative and a quantitative analysis respecting contents of the solution or liquid $s$ of cell A.

When the recorder M, Fig. 1, is of the intermittently acting type aforesaid, the slidewire S1 is periodically adjusted in the one direction or the other to extent sufficient eventually to effect balance of the electromotive forces introduced in the input circuit of the tube T by the fall of potential due to the current through the resistance D, and the fall of potential between the contact $e$ and one end of slidewire S1. There may be associated with the slidewire S1 a calibrated scale J which in coaction with the pointer $e$ visibly indicates at any time the magnitude of current passing through cell A.

With slidewire S may be associated a calibrated scale K which at any time visibly indicates, because of the relation thereto of the contact $d$, the voltage impressed upon the cell A, so that, aside from the production of a graph upon a recorder chart of the voltage-current relations involved, there may be noted from time to time the magnitudes of current through the cell and the concurrent magnitudes of voltage impressed thereon, from which there may be plotted in ordinary manner a graph yielding results, similar or equivalent to those illustrated in Fig. 5.

Referring to Fig. 3, a system in general similar to that of Fig. 1 and utilizable for like purposes, including the production on a chart of a graph or characteristic curve of voltage-current relations, as in Fig. 5, comprises a cell A, illustrated as of the dropping electrode type, though as in the case of Fig. 1 it may be of the stationary electrode type, in combination with means for varying the voltage impressed upon the cell comprising battery B, resistance R, slidewire S and contact $d$ of the character and operated as described in connection with Fig. 1. The current passing through cell A passes also, for the polarity of battery B indicated, in the direction of the arrows, through resistance D, generically comparable with resistance D of Fig. 1, and through the resistance R6 and the deflecting current meter L, which may be calibrated in micro amperes for example, for reading at any time the magnitude of current passing through cell A and resistances D and R6 and meter L in series with each other. A reversing switch O serves to reverse the connections of the meter L with respect to its circuit, as circumstances may require. With the series circuit described is associated a multistage thermionic amplifier system, self-balancing, and of the negative feedback type. The amplifier comprises the resistance-coupled tubes T1, T2 and T3; tubes T1 and T2 are pentodes, for example of type 1B4P, and the triode T3 may be of type 30. Through switch P there is impressed upon the input electrodes, grid $g$ and cathode $k1$ of tube T1, a difference of potential representative of the current passing through the cell A from source B. The amplifier accordingly produces in its output or plate circuit, of which the current source is B2, a current whose magnitude is representative of the current passing through the cell, and which is passed through resistance R6 and meter L, to the cathode $k3$ of tube T3. The output current of the amplifier therefore causes a fall of potential across resistance R6 and meter L equal and opposite to the fall of potential due to the cell current passing through resistance D. The amplifier system is practically instantaneously self-balancing, and during operation there occur potential differences between the right-hand terminal 5 and resistance R6 and the tap 6 thereon representative of magnitudes of cell current passing through the cell A. These potential differences occur between the terminals 7 and 8 to which is or may be connected the terminals of a potentiometer recorder, as of the type of aforesaid Leeds patent or of any other suitable type, the potentiometer having its own galvanometer, distinct from meter L, operating in the usual way to deflect its needle in response to the potential differences between the terminals 7, 8 to control the recorder mechanism to produce a graph on a chart, such as C, Fig. 5, which again is driven at speed, to which the speed of adjustment of slidewire S with respect to contact $d$ is equal or bears a predetermined fixed relation. As in the case of Fig. 1, the adjustment of slidewire S with respect to its contact $d$ may be effected by a synchronous motor operated from a source of alternating current of frequency equal to that of the alternating current which energizes the chart-driving motor of the potentiometer recorder connected across terminals 7 and 8.

Here again the graph obtainable is like that described in connection with Fig. 5, from which the nature and concentrations of substances in the solution or liquid $s$ of the cell A are determinable, as well as other characteristics or magnitudes. In brief, with the recorder utilized as described in connection with Fig. 3, the voltage impressed upon the cell by source B varies as a function of time, and accordingly the ordinates of the graph, Fig. 5, again represent voltages, while abscissae represent magnitudes of current through the cell.

Across resistances D and R6 and meter L, Fig. 3, are connected time-constant producing resistance E and capacity F1, analogous to the use of the same elements in Fig. 1, or the capacity F may be connected between the right-hand terminal of the resistance E and lower terminal of resistance D, the amplifier system in this case being also preferably shielded by a system which is grounded at and generically represented by ground G at the right.

The time constant so effected by resistance E and capacitor F1 is of magnitude to reduce the speed of response of the amplifier system to changes in fall of potential across resistances D and R6 and meter L, if and when that be necessary.

Where the recorder connected across terminals 7, 8 is of the intermittently-acting type, as in the case of aforesaid Leeds patent, there may be associated therewith a resistance and capacity to provide a time constant, when suitable or necessary, of magnitude to prevent disturbances in smoothness of the resultant graph due to intermittent action of the recorder.

It is characteristic of the system of Fig. 3 that any fluctuations in current passing through the cell A which cause fluctuations in difference of potential across the resistance D, produce equal and opposite fluctuations in the potential differences between the terminals of resistance R6 and meter L in series, so that, at all times, within the limit of the time constant determined by network E, F1, regardless of the actual magnitude of the current, through the cell, the potential impressed upon it, by slidewire S, with which again may be provided a scale K as in Fig. 1, represents the true polarizing potential applied to the cell system.

To eliminate the effects of the time constant of network E, F1 upon the instantaneous balance of the feedback and input potentials of the feedback amplifier, such time constant network E, F1, or equivalent, may be introduced at any point subsequent to the feed-back stage, even though there be subsequent stages of amplification, of the amplifier, i. e., the network may be introduced between terminals 7 and 8, Fig. 3, which connect to the recorder of aforesaid Leeds' type, or at any preceding point subsequent to the feed-back stage.

To adjust the current in the output circuit of the amplifier, as derived from source B2, to procure zero potential difference across resistance R6 and meter L, to represent or correspond with zero potential applied to the grid $g$ of tube T1, the switch P is thrown to its lower position indicated, in effect to eliminate possibility of any current flow through cell A, resistances D and R6, and meter L; and the manually adjustable contacts 9 and 10 are adjusted with respect to their coacting slidewires 11 and 12 to procure that grid bias for the tube T1 which will so adjust aforesaid output current of the last stage of the amplifier to effect zero deflection of the meter L until that output current is equal and opposite to the current from source B4 through resistances R7, R6 and meter L; when such adjustment has been procured, the switch P is returned to its upper position indicated, for further measurement and recording of the cell current for analysis or other determination of characteristics of contents of the solution or liquid $s$ of the cell.

The slidewires 11 and 12 are in series with each other, and the battery or other source B3 and a resistance 13; shunting slidewire 12 is a resistance 14. Adjustment of contact 9 effects coarse, and adjustment of contact 10 effects fine adjustment of aforesaid grid bias.

In lieu of the potentiometer balancing system of Fig. 1, there may be employed the broadly equivalent arrangement of Fig. 4. The current through cell A passes through a variable portion $Rx$ of resistance R8 and a battery B5, so poled that there exists voltage balance between the contact 15, bearing on R8, and the lower terminal of source B5; at balance, voltage $Rx$ equals the voltage of source B5, and voltage $E^o$ is zero. The ballistic integrator, the time-constant network E, F1, is connected between the upper end of resistance R8 and the lower terminal of battery B5. With this arrangement the magnitude of the current through cell A, portion $Rx$ of resistance R8 and battery B5, is at voltage balance inversely proportional to resistance $Rx$. Other reference characters identical with those of Fig. 1 relate to similar elements and points of connection, battery B1 in this case serving only to heat cathode $k$ and provide a bias upon the control electrode $f$ of tube T.

Further aspects of my methods, apparatus and further details comprehended by or pertinent to my present invention are described in Technical Publication, E–94(1), of Leeds & Northrup Company, of Philadelphia, Pennsylvania, filed herewith and made part hereof as and for disclosure of said further aspects and details, and for further description of my methods and apparatus and some of the fields in which they are applicable.

What I claim is:

1. A method which comprises applying an electro-motive-force to an electrolytic cell having a polarized electrode, producing by the current passing through the cell and an impedance a difference of potential across the impedance representative of said current, opposing to said potential difference a second difference of potential, varying at least one of said potential differences to effect a balance of them, and at balance to effect application to said cell of said electro-motive-force undiminished by the difference of potential across said impedance, and determining the magnitude of said current for said application of undiminished electro-motive force to said cell.

2. A method which comprises applying an electro-motive-force to an electrolytic cell having a polarized electrode, progressively varying the magnitude of said electro-motive-force, producing across an impedance by the current passing through said cell and the impedance a varying difference of potential representative of the varying magnitude of said current, opposing to said potential difference a second difference of potential, varying at least one of said potential differences to effect a balance of them for different magnitudes of said first-named potential difference and at balance to effect application to said cell of said electro-motive-force undiminished by the difference of potential across said impedance, and at balance determining the various magnitudes of said current for the various magnitudes of said electro-motive-force from the magnitudes of variation of potential difference effecting balance.

3. A method which comprises applying an electro-motive-force to an electrolytic cell having a polarized electrode, producing across an impedance by the current passing through said cell and the impedance a difference of potential representative of said current, under control of a current varying in representation of variation of said potential difference producing a graph of said first-named current, and in producing said graph varying a second difference of potential opposed to said first-named potential difference to effect balance of said potential differences for application to said cell of said electro-motive-force undiminished by said first-named difference of potential.

4. A method which comprises applying an electro-motive-force to an electrolytic cell having a polarized electrode, varying the magnitude of said electro-motive-force as a function of time, producing across an impedance by the current passing through said cell and the impedance a difference of potential representative of said current, under control of a current varying in representation of variation of said potential difference producing a graph whose coordinates are magnitudes of said first-named current and of time or magnitudes of electro-motive-forces applied to said cell, and in producing said graph varying a second difference of potential opposed to said first-named potential difference to effect balance of said potential differences for application to said cell of said electro-motive-force undiminished by said first-named difference of potential.

5. A method which comprises applying an electro-motive-force to an electrolytic cell having a polarized electrode, producing across an impedance by the current passing through said cell and the impedance a difference of potential representative of said current, amplifying said potential difference, under control of an effect of the amplification varying in representation of variation of said potential difference producing a graph of said first-named current, and in producing said graph varying a second difference of potential opposed to said first-named potential difference to effect balance of said potential differences for application to said cell of said electro-motive-force undiminished by said first-named difference of potential.

6. A method which comprises applying an electro-motive-force to an electrolytic cell having a polarized dropping electrode, producing by the current passing through the cell and an impedance a fluctuating difference of potential representative of said current, effecting ballistic integration of the fluctuating potential difference in production of a time constant greater than the period of dropping from said electrode, and determining the magnitude of said current from the ballistic integration of said fluctuating potential difference.

7. A method which comprises applying an electro-motive-force to an electrolytic cell having a polarized dropping electrode, producing by the current passing through the cell and an impedance a fluctuating difference of potential representative of said current, effecting ballistic integration of the fluctuating potential difference in production of a time constant greater than the period of dropping from said electrode, opposing to said difference of potential a second difference of potential, varying at least one of said potential differences to effect a balance of them, and determining the magnitude of said current from the magnitude of variation of potential difference effecting said balance.

8. A method which comprises applying an electro-motive-force to an electrolytic cell having a polarized electrode, producing by the current passing through said cell and an impedance a difference of potential representative of said current, under control of a current varying in representation of variation of said potential difference intermittently producing successive components of a graph representative of said first-named current, and effecting ballistic integration of said control current in production of a time constant greater than the period of intermittence of production of said graph.

9. A method which comprises applying an electro-motive-force to an electrolytic cell having a polarized electrode, producing across an impedance by the current passing through said cell and the impedance a difference of potential representative of said current, by negative feed-back amplification of said potential difference producing a current varying in representation of variation of said potential difference and a second potential difference balancing said first-named potential difference for application to the cell of said electro-motive-force undiminished by said first-named potential difference, and under control of said second-named current producing an indication of said first-named current for magnitudes of said electro-motive-force undiminished by said first-named potential difference.

10. A system comprising an electrolytic cell having a polarized electrode, means for applying an electro-motive-force to the cell, an impedance through which and said cell is passed the resultant current to produce across the impedance a difference of potential representative of said current, a second source of difference of potential opposed to said first-named potential difference and to said electro-motive-force, means for varying at least one of said potential differences to effect a balance of them and to ensure application of said electro-motive-force to the cell undiminished by said first-named difference of potential, and means for determining the magnitude of said current from the magnitude of variation of potential difference effecting said balance.

11. A system comprising an electrolytic cell having a polarized electrode, means for applying an electro-motive-force to the cell, an impedance through which and said cell is passed the resultant current to produce across the impedance a difference of potential representative of the varying magnitude of said current, a second source of potential difference opposed to said first-named potential difference and to said electro-motive-force, means for varying the magnitude of at least one of said potential differences to effect balance of them for different magnitudes of said first-named potential difference and at balance to ensure application of said electro-motive-force undiminished by said first-named potential difference, and means for determining the various magnitudes of said current for the various magnitudes of said first-named potential difference from the magnitudes of variation of potential difference effecting said balance.

12. A system comprising an electrolytic cell having a polarized electrode, means for applying an electro-motive-force to the cell, an impedance through which and said cell is passed the resultant current to produce across the impedance a difference of potential representative of said current, means for producing a current varying in representation of variation of said potential difference, a second source of difference of potential opposed to said electro-motive-force and to said first-named potential difference, means for varying the magnitude of said second-named potential difference, and means controlled by said second-named current for producing a graph representative of said first-named current and for actuating said adjusting means to effect balance of said potential differences and at balance to ensure application of said electro-motive-force undiminished by said first-named difference of potential.

13. A system comprising an electrolytic cell having a polarized electrode, means for applying an electro-motive-force to the cell, means for varying the magnitude of said electro-motive-force, an impedance through which and said cell is passed the resultant current to produce a difference of potential representative of said current, a second source of potential difference opposed to said first-named potential difference, means for varying the magnitude of said second potential difference, a chart, a marker, means effecting movement of said chart with respect to said marker and for adjusting said electromotive-force varying means at definitely related rates, and means responsive to unbalance of said potential differences for effecting movement of said marker and for actuating said means for varying the magnitude of said second potential difference to restore balance and at balance to ensure application of said electro-motive-force undiminished by said first-named potential difference.

14. A system comprising an electrolytic cell having a polarized electrode, means for applying an electro-motive-force to the cell, an impedance through which and said cell is passed the resultant current to produce across the impedance a difference of potential representative of said current, a second source of potential difference opposed to said first potential difference, means for varying the magnitude of said second potential difference, an amplifier, means for impressing the resultant of the opposed potential differences upon the input thereof, means controlled by the output of said amplifier for producing a graph representative of said first-named current and for actuating said means for varying said second potential difference to balance said potential differences for application of said electro-motive-force undiminished by said first-named potential difference.

15. A system comprising an electrolytic cell having a polarized dropping electrode, means for applying an electro-motive-force to the cell, an impedance through which and said cell is passed the resultant fluctuating current of period related to the period of dropping from said electrode to effect a difference of potential representative of said current, means for effecting a time constant of magnitude greater than the period of fluctuation of said current, and means for determining the magnitude of said current in response to the ballistic integration of said potential difference effected by said time-constant producing means.

16. A system comprising an electrolytic cell having a polarized dropping electrode, means for applying an electro-motive-force to the cell, an impedance through which and said cell is passed the resultant fluctuating current of period related to the period of dropping from said electrode to effect a difference of potential representative of said current, a second source of potential difference opposed to said first-named potential difference, means for varying at least one of said potential differences, means for effecting a time constant of magnitude greater than the period of fluctuation of said current, and means operative in response to the ballistic integration produced by said time-constant effecting means for actuating said means for said at least one of said potential differences and for determining the magnitude of said current.

17. A system comprising an electrolytic cell having a polarized electrode, means for applying an electro-motive-force to the cell, an impedance through which and said cell is passed the resultant current to produce a difference of potential representative of said current, means for intermittently producing successive graph components, means responsive to current representative of said potential difference for actuating said last-named means, means effecting ballistic integration of at least one of said currents with a time constant greater than the period of intermittence of said components.

18. A system comprising an electrolytic cell having a polarized electrode, means for applying an electro-motive-force to the cell, an impedance through which and said cell is passed the resultant current to produce across the impedance a difference of potential representative of said current, an electronic amplifier of negative feed-back type for producing a difference of potential balancing said first difference of potential to ensure application to said cell of said electromotive force undiminished by the potential drop produced by flow of said current through said impedance, and means for producing an indication representative of said first-named current controlled by the output of said amplifier.

ROBERT H. CHERRY.